(12) United States Patent
Wilenski et al.

(10) Patent No.: US 10,227,170 B2
(45) Date of Patent: Mar. 12, 2019

(54) IMPACT RESISTANT LIQUID BLADDERS

(71) Applicant: The Boeing Company, Chicago, IL (US)

(72) Inventors: Mark S. Wilenski, Mercer Island, WA (US); Michael P. Kozar, Mercer Island, WA (US); Amy E. Bahe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 434 days.

(21) Appl. No.: 14/949,181

(22) Filed: Nov. 23, 2015

(65) Prior Publication Data

US 2017/0144818 A1 May 25, 2017

(51) Int. Cl.
*B65D 81/02* (2006.01)
*B65D 75/28* (2006.01)
*B65D 30/08* (2006.01)
*B65D 90/04* (2006.01)

(52) U.S. Cl.
CPC ............ *B65D 81/02* (2013.01); *B65D 31/04* (2013.01); *B65D 75/28* (2013.01); *B65D 90/046* (2013.01); *B65D 2590/046* (2013.01)

(58) Field of Classification Search
CPC .... B60K 2015/03085; B60K 15/03177; B60K 15/00; B60K 2015/03309; B60K 2015/03407; B60K 2015/03477; B65D 75/28; B65D 81/02; B65D 2590/046; B65D 90/046; B65D 31/04; B32B 2260/021; B32B 2262/0269; B32B 2262/0276; B32B 2262/101; B32B 2262/106; B32B 2307/762; B32B 2307/7265; B32B 2439/00; B32B 2581/00; B32B 25/10; B32B 27/12; B64D 37/06; B64D 37/32
See application file for complete search history.

(56) References Cited

U.S. PATENT DOCUMENTS

| | | | |
|---|---|---|---|
| 4,925,057 A | 5/1990 | Childress et al. | |
| 5,105,590 A * | 4/1992 | Dykmans | B65D 88/34 52/223.3 |
| 7,861,844 B2 | 1/2011 | Hayduchok et al. | |
| 7,900,333 B2 | 3/2011 | Tweet et al. | |
| 8,777,158 B2 | 7/2014 | Erickson | |
| 2010/0316310 A1 * | 12/2010 | Heater | B60K 15/03177 383/119 |
| 2015/0291332 A1 | 10/2015 | Misciagna | |

* cited by examiner

*Primary Examiner* — Camie S Thompson
(74) *Attorney, Agent, or Firm* — McDonnell Boehnen Hulbert & Berghoff LLP

(57) ABSTRACT

A bladder having a fluid impermeable material layer that is compatible with a liquid held in the bladder and at least one impact protection layer that is conformally arranged to span a surface area of the liquid impermeable material.

21 Claims, 5 Drawing Sheets

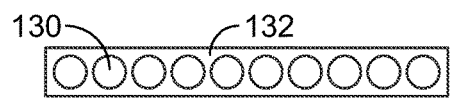
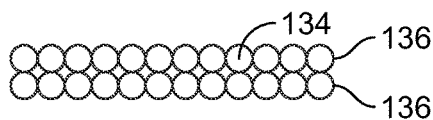
FIG. 6A  FIG. 6B
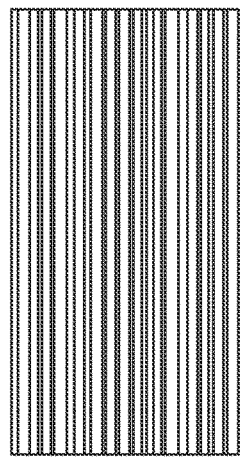
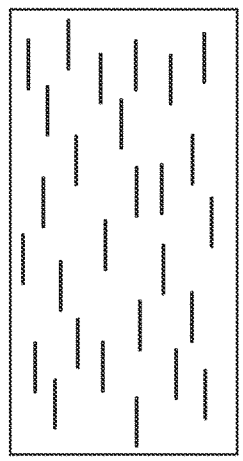
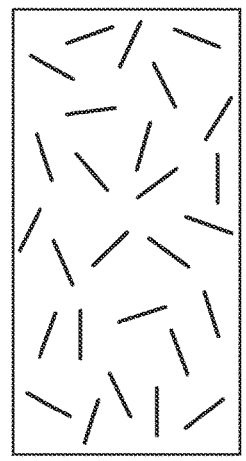
FIG. 6C  FIG. 6D  FIG. 6E
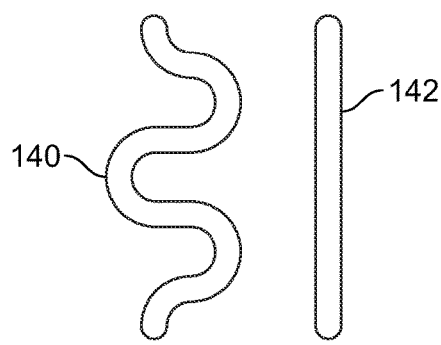
FIG. 7

IMPACT RESISTANT LIQUID BLADDERS

BACKGROUND OF THE INVENTION (1) Field of the Invention

This invention relates to fluid containing bladders that include at least one impact protection layer.

(2) Description of the Art

Fluid containers are routinely used to hold hazardous and non-hazardous gasses and liquids such as hydrocarbons (fuels such as gasoline and kerosene, LPG, crude oil, petrochemicals and the like), liquid hazardous wastes, aqueous acidic and caustic materials, industrial feedstocks, foodstuffs such as milk and oils, and a wide variety of additional liquid materials. Liquid containers often include inert material bladders within the container to retain the desired liquid and to prevent the liquid from contacting the container walls which might not be liquid impermeable or might not be inert to the liquid held in the container. The bladders also ensure that liquid leaks are prevented in the event the outer container is breached by a perforation, by corrosion or by any other mechanism.

Containers that include bladders can be damaged by impacts and other collisions in such a way that both the outer container and the bladder are perforated in which case the fluid in the bladder is able to leak out of the bladder and the container through the hole or wound. Preventing fluid leakage can be especially important with fuel containers such as fuel tanks where a sudden impact can cause the container and/or bladder to leak or completely rupture thereby eliminating the supply of liquid fuel that is necessary to power the vehicle. Such fuel leaks can result in a financial loss of valuable fuel, in environmental contamination, in a risk of fire, or in a total vehicle loss. Military vehicles (e.g., military aircraft, tanks, trucks and the like) are especially vulnerable to fuel tank damage such as damage during collisions or crashes. There is a need therefore for bladders that withstand impacts, collisions and crashes without rupturing.

SUMMARY OF THE INVENTION

The presently disclosed impact resistant bladders can be used in conjunction with any fluid holding container in order to inhibit and/or essentially prevent liquid bladder rupture. For example, bladders with one or more impact protection layer may be placed within a fluid-holding container such as a fuel tank to inhibit the rupture of the bladder in the event of an impact, collision, crash or similar disruptive event. The impact protection layer(s) can be capable of attenuating the collision forces acting upon a bladder, may be lighter and easier to install than conventional, and/or may be more flexible than conventional self-sealing bladders.

One aspect this invention includes a bladder comprising a fluid impermeable material layer that is compatible with a fluid held in the bladder, and at least one impact protection layer that is conformally arranged to span a surface area of the fluid impermeable material layer wherein the impact protection layer includes at least one first fiber and at least one second fiber wherein the at least one first fiber fails at a lower level of strain than the at least one second fiber.

Another aspect of this invention is a bladder comprising a liquid impermeable material layer that is compatible with a fluid held in the bladder, and at least one impact protection layer that is conformally arranged to span a surface area of the liquid impermeable material layer wherein the impact protection layer includes a first fiber material layer having a plurality of first fibers and a second fiber material layer having a plurality of second fibers wherein the plurality of first fibers fail at a lower level of strain than the plurality of second fibers.

Yet another aspect of this invention is a liquid bladder comprising a liquid impermeable material layer that is compatible with a liquid held in the bladder, and at least one impact protection layer that is conformally arranged to span a surface area of the liquid impermeable material layer wherein the impact protection layer includes a plurality of first fibers and a plurality of second fibers wherein the plurality of second fibers are geometrically designed to have a higher global failure strain than the plurality of first fibers.

BRIEF DESCRIPTION OF THE DRAWINGS

FIG. 6A, FIG. 6B, FIG. 6C, FIG. 6D and FIG. 6E are schematic representations of different fiber layer constructions; and FIG. 7 are representations of certain fibers that are geometrically designed to have different fiber failure strains.

DESCRIPTION OF CURRENT EMBODIMENTS

Figure 1:
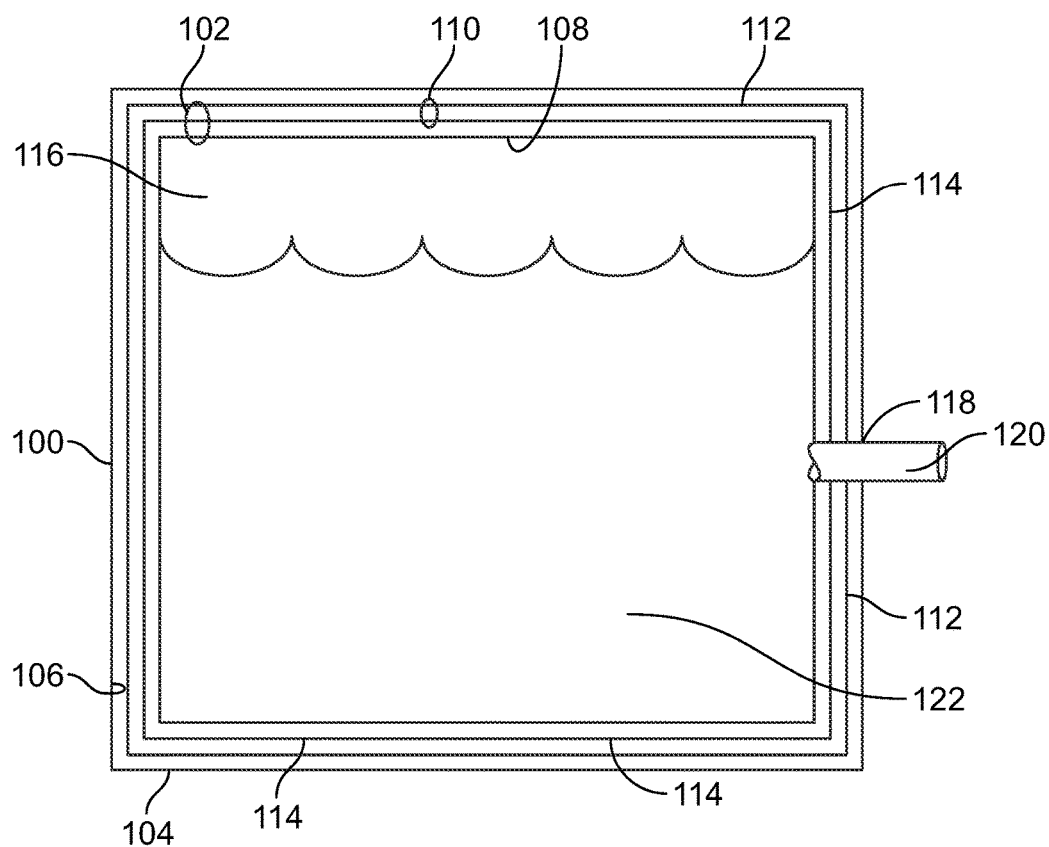
FIG. 1 is a schematic representation illustrative of a container for holding a fluid that includes a bladder with at least one impact resistant layer according to the present disclosure.

Impact resistant bladders and related methods are disclosed herein. The impact resistant bladder may be used to inhibit and/or prevent the formation of holes and wounds in a fluid container caused by collisions, such as collisions between an aircraft or motor vehicle that has a fuel tank including an impact resistant liquid bladder with other vehicles, with the ground, with projectiles, debris, shrapnel and so forth. The presently disclosed impact resistant bladders may provide bladder walls with improved rupture resistance in comparison to prior art bladders, may be able to reduce the size of any ruptures formed, may be easier to install than prior art bladders, may be more flexible than prior art bladders, may be lighter than prior art bladders, may have a thinner walls than prior art bladders, and/or may enable the cavity or container in which the self-sealing bladder is placed to hold more fuel than if a prior art bladder is used.

Impact resistant bladders that are described herein have a multitude of possible uses. The impact resistant bladders may be used in bladder holding containers of any sort that are used to store, transport, provide etc. . . . hazardous and non-hazardous fluids; including gases such as air, noble gases, and reaction products; and including liquids such as hydrocarbons (fuels such as gasoline and kerosene, LPG, crude oil, petrochemicals and the like), liquid hazardous waste, aqueous acidic and caustic materials, industrial feedstocks, foodstuffs such as milk and oils, and a wide variety of additional liquid materials. The impact resistant bladders of this invention will be discussed below primarily with reference to their use in holding liquids. However, as noted above, the bladders are equally useful in holding any fluids— liquid or gas.

Impact resistant bladders may be used in conjunction with containers including, but not limited to drums, barrels, storage tanks, fuel tanks, tanker trucks, railroad tank cars, liquid storage and liquid feed vessels and any similar containers. Impact resistant bladders may be particularly useful in conjunction with containers in the form of fuel tanks and in particular aircraft fuel tanks and/or military vehicle fuel tanks because these types of fuel tanks are prone to perforation by military ordinance and/or because fuel loss from these types of fuel containers can have catastrophic consequences. However, the impact resistant bladders can be equally useful in conjunction with conventional fuel tanks such as those found in watercraft, land vehicles, spacecraft, automobiles, motorcycles, trucks, construction equipment, buses, and other like fuel propelled vehicles.

Impact resistant bladders can be used in association with containers and tanks having a wide range of volumes. For example, the bladders can have a liquid volume of as little as 1 L or as great as 100,000 L or even much larger. For very large tanks and containers, multiple bladders can be placed in a container and interconnected with conduits to provide the necessary fluid volume.

Turning now to FIG. 1 there is shown a schematic of a container (100) including a bladder (102). Container (100) includes an outside surface (104) and an opposing inside surface (106). Impact resistant bladder (102) includes a liquid impermeable layer (108) that is compatible with (inert to) the liquid held in the bladder (the "bladder liquid"). Impact resistant bladder (102) further includes at least one impact protection layer (110) that is, in FIG. 1, conformally arranged to span a surface area of the liquid impermeable material layer (108). In FIG. 1, impact protection layer (110) includes a first fiber layer (114) and a second fiber layer (112) where the fibers of first fiber layer (114) which lies nearest the liquid (122) in the bladder have a lower failure strain than the fibers in the second fiber layer (112) that lies further from the liquid in the bladder.

Container (100) will define a volume (116) which can be occupied by fluid filled impact resistant bladder (102). Container (100) will typically include one or more openings (118) though which a conduit (120) associated with impact resistant bladder (102) can pass. The conduit (120) may be used to direct liquid (122) into or out of impact resistant bladder (102). Multiple conduits can be associated with impact resistant bladder (102) where, for example, one conduit can be used to direct liquid (122) into impact resistant bladder (102) and another separate conduit can be used to withdraw liquid (122) from impact resistant bladder (102).

Figure 2A:
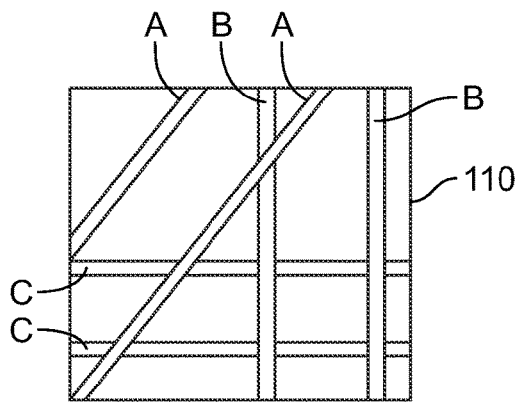
FIGS. 2A-2F are schematic representations respectively of a wall of an impact resistant bladder embodiment and a view of a falling liquid containing bladder prior to the bladder colliding with the ground (FIGS. 2A, 2B); as the bladder is colliding with the ground (FIGS. 2C, 2D); and once the collision with the ground is complete (FIGS. 2E, 2F)
Figure 2B:
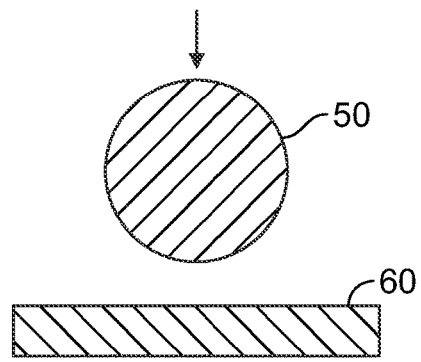
Figure 2C:
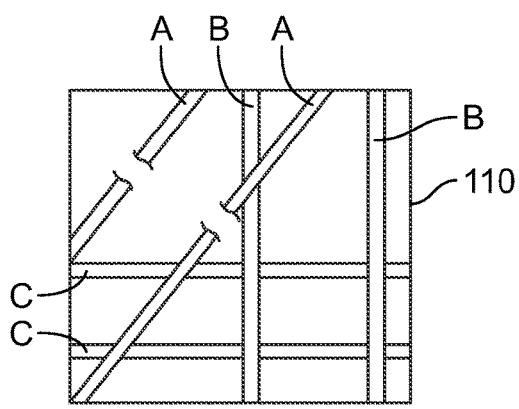
Figure 2D:
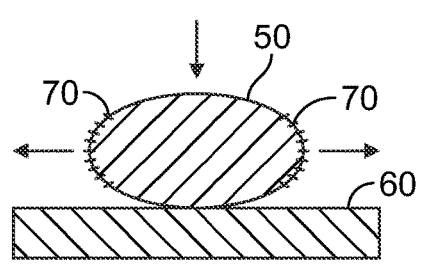
Figure 2E:
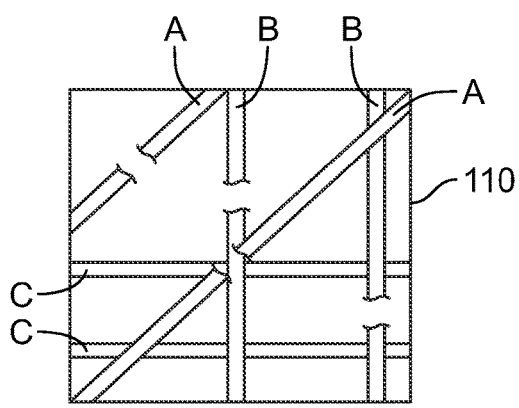
Figure 2F:
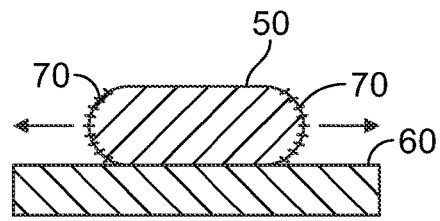

A manner in which the impact protection layer functions to protect a bladder from rupturing is shown schematically in FIGS. 2A-2F. FIGS. 2A, 2C and 2E are schematic views of a bladder impact protection layer (110) including fibers A, B and C where each of fibers A, B and C have different levels of strains at which the fiber fails and where fiber A has the lowest fiber failure strain, fiber B has the next lowest fiber failure strain and fiber C has the highest fiber failure strain. FIGS. 2B, 2D and 2F are schematic views of a liquid filled bladder (50) falling towards and colliding with the ground (60).

In FIG. 2B, liquid bladder (50) is positioned above but falling towards the ground (60) as represented by the downwardly oriented vertical arrow. In corresponding FIG. 2A, all of the impact protection layer fibers A, B and C are intact.

In FIG. 2D, bladder (50) has just collided with the ground (60). At this point in time, some of the liquid in the bladder is still falling towards ground (60) (represented by the downwardly oriented vertical arrow) while the ground has deflected the force of some of the fluid falling towards the ground and has redirected the fluid force in the x-direction (represented by the horizontally oriented arrows) thereby increasing the forces directed at expanding side wall portions (70) of bladder (50). In corresponding FIG. 2C, the increasing force causes fibers A—the fibers with the lowest fiber failure strain to fail. The failure of fibers A absorbs energy created by the moving fluid while leaving fibers B and C intact.

In FIG. 2F, the downward movement of liquid in bladder (50) has essentially stopped while at the same time the force applied by the moving liquid to expanding side will portions 70 increases. In corresponding FIG. 2E, the increasing force causes fibers B—the fibers with the next lowest fiber failure strain—to fail while fibers C remain intact. The failure of fibers B absorbs additional fluid energy but leaves fibers C intact. The fiber failure can continue either until the liquid force applied to the bladder wall portions begins to decrease at which point rupture is prevented, or until no fibers remain to fail.

Figure 3:
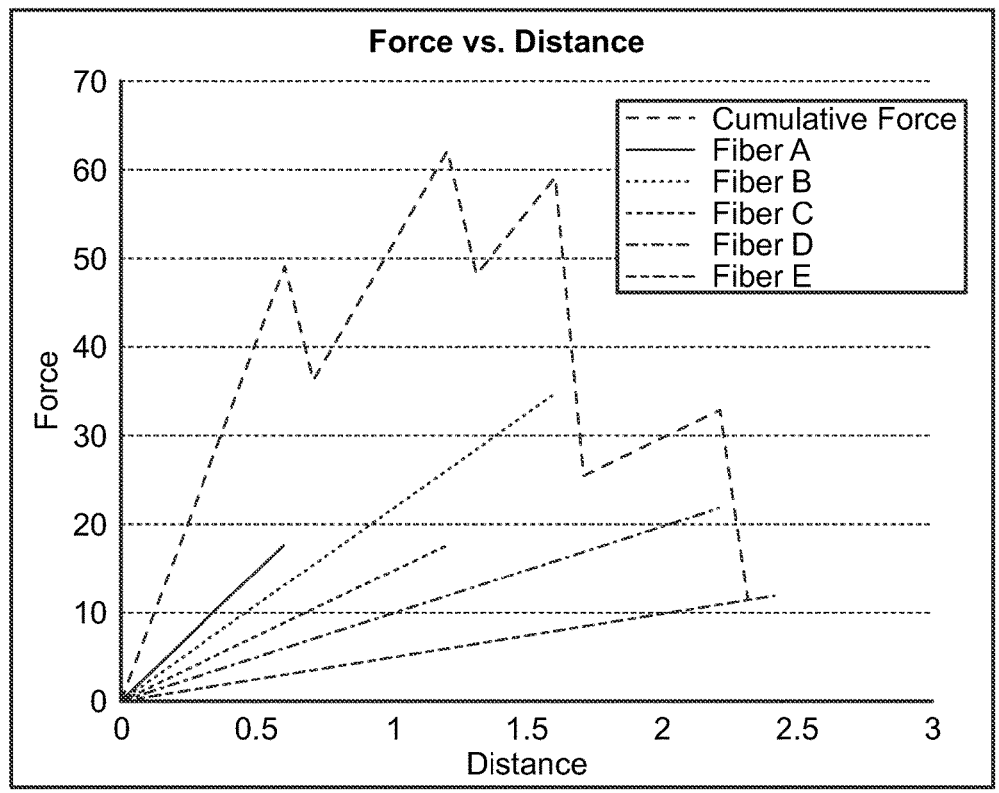
FIG. 3 is a graphical representation of force over distance experienced by fluid-containing bladders during a loading event such as an object collision.

FIG. 3 is a plot of a schematic representation of the force being exerted on a bladder wall versus the distance of bladder wall expansion. In FIG. 3, fibers A have the lowest fiber failure strain followed by fibers B, C, D and finally fibers E have the highest fiber failure strain. In FIG. 3, the jagged dashed line represents the cumulative force on the bladder walls. As the fluid force causes the bladder walls to stretch and the bladder wall distance to increase, the fibers begin to fail in order of A, B, C, D and E. When fibers A are loaded to failure, they absorb some of the fluid kinetic energy and the cumulative force on the bladder wall decreases while leaving fibers B, C, D and E intact. The sequential failure of fibers B, C and D likewise absorb fluid kinetic energy and cause a momentary decrease in the cumulative force on the bladder walls until the fluid kinetic energy is under control and the cumulative force on the bladder walls stops increasing following the failure of fibers D leaving fibers E intact.

Figure 4:
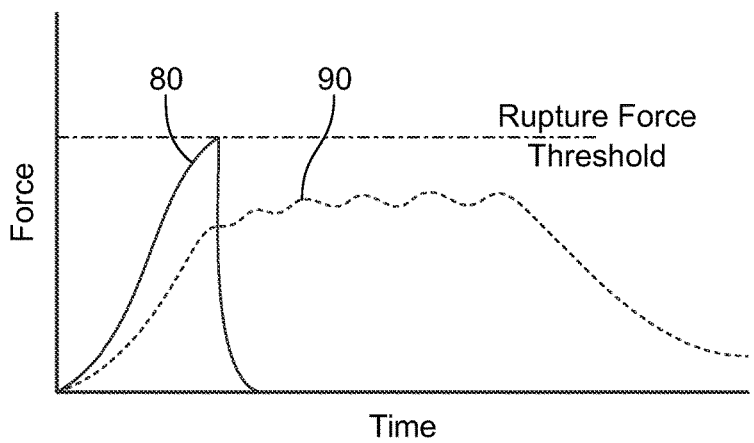
FIG. 4 is a graphical representation of the force evolved over time of a collision involving an unprotected fluid-containing bladder (80) and a collision involving a bladder including at least one impact protection layer (90)

FIG. 4 is a plot of a schematic representation of cumulative force created by fluid kinetic energy acting on a bladder without an impact protection layer—plot line (80) and cumulative force acting on a bladder with an impact protection layer (90). In each plot, the cumulative force is caused by the kinetic energy of liquid held inside the bladders moving as result of a collision between the bladder and a second object. In the bladder without an impact protection layer, the liquid force acting on the bladder wall increases until the bladder rupture force threshold is reached at which point the bladder ruptures releasing fluid from the bladder which allows the cumulative force acting on the bladder to quickly drop to zero.

In a bladder with at least one impact protection layer, the fibers have one or more different failure strains and absorb the kinetic energy of the moving/falling fluid as shown in plot line (90). Once enough fluid kinetic energy has been absorbed to prevent the bladder walls from reaching the bladder rupture threshold force, the cumulative liquid force acting on the bladder walls drops back towards zero and the bladder remains intact.

The bladders of this invention have an impact protection layer. The impact protection layer may be a single material layer, may be two layers of material or it may be a plurality of material layers. Moreover, each material layer may include one, two or a plurality of fiber types where each fiber type has a different fiber failure strain. Moreover, each individual fiber may fail multiple times during a collision event.

Figure 5A:
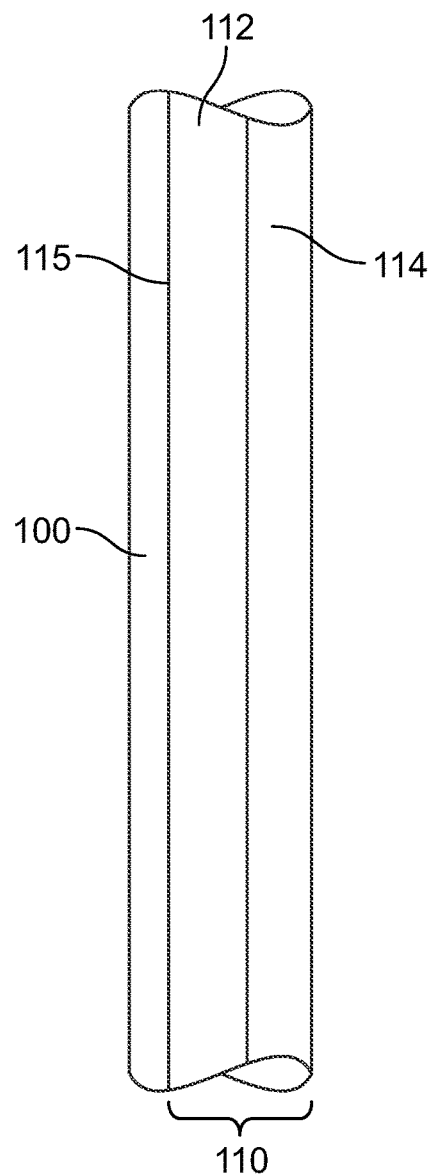
FIG. 5A and FIG. 5B are schematic representations of a cross-section of a container and bladder in which the bladder includes at least two fiber layers.
Figure 5B:
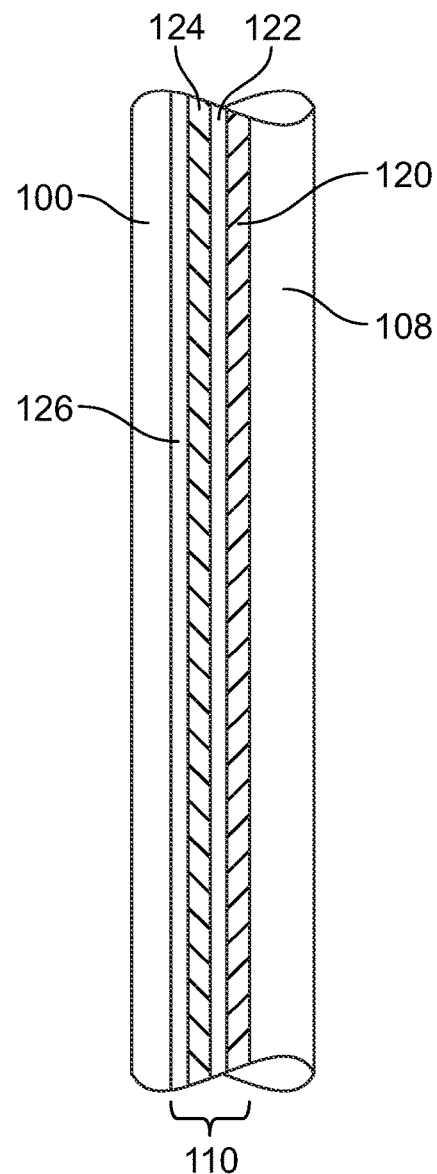

Referring now to FIGS. 5A and 5B, there are shown schematic cross-section representations of a container having an impact resistant bladder including an impact protection layer having at least two fiber material layers. In FIG. 5A, the bladder includes a first fiber material layer (114) that also doubles as the bladder liquid impermeable layer and a second fiber material layer (112). Having a first fiber material layer that doubles as the bladder liquid impermeable layer may simplify bladder construction and reduce bladder construction costs. In FIG. 5A, second fiber material layer (112) is nearer to bladder outside surface (115) so second fiber material layer (112) may be made of fibers having a higher failure strain than the fibers used to form first fiber material layer (114). The first fiber material layer and second fiber material layer respond to a collision with an object by absorbing energy created by the acceleration of fluid inside the bladder against the bladder wall in a progressive manner where fiber layers having lower failure strains absorb the force energy and then fail whereupon fibers and/or fiber layers including fibers with higher failure strains continue to absorb the fluid energy and fail and so on. In this manner, the plurality of fiber layers operate to reduce the peak force applied to the bladder by the moving liquid to such an extent that the experienced peak force is less than the force required to rupture the bladder.

In FIG. 5B, the bladder includes a liquid impermeable layer (108) that is not part of impact protection layer (110). In FIG. 5B, impact protection layer includes a plurality of (four) separate and adjacent fiber material layers (120, 122, 124 and 126—from closest to furthest from liquid impermeable layer (108)). In this aspect, liquid impermeable layer optionally includes four fiber material layers where the failure strains of the fiber layers are graduated from lowest (108)—nearest the liquid impermeable layer (108)—to highest (120)—furthest from the liquid impermeable layer (126).

In the various aspects of this invention, the term fiber failure strain may be used to refer to the fiber failure strain of the individual fibers used to form a fiber layer. Alternatively term fiber failure strain may be used to refer to the overall measured failure strain of an entire fiber material layer—e.g., composite material fiber layer—which includes a plurality of individual fibers.

In one aspect the first fiber layer and/or second fiber layer may be composite material layers that include fibers and a matrix material. The use of a composite material may serve to stabilize the fiber used in the composite material and/or to provide the fiber layer with some structural support and/or to aid in transferring loads between and into fibers in the composite material. The composite material matrix may be selected from thermoplastic or thermosetting resins and polymers. Additionally, in certain aspects, the matrix material may have a thickness or may be selected from a material that has a higher failure strain than the fibers associated with the matrix material so as to ensure that the fiber material absorbs and/or distributes the forces exerted by liquid in a bladder as a result of a collision event.

FIG. 6A is an edge cutaway view of a fiber material layer that is a composite material that includes a plurality of fibers (130) and a matrix material (132). In another aspect of this invention as shown in FIG. 6B, a fiber material layer consists essentially of fibers (134) where individual fibers are made from one or more different materials. The fiber material layer shown in FIG. 6B includes two fiber plies (136). Forming fibers into discrete plies can facilitate the formation of fiber layers and the construction of an impact protection layer that includes two or more fiber material plies. The fiber plies may be formed in many ways. For example, the fiber plies may be selected from one or more of plies of woven fibers, fiber mats, continuous aligned fibers (FIG. 6C), discontinuous aligned fibers (FIG. 6D) and discontinuous random oriented fibers (FIG. 6E).

The fibers used to form a ply may be one or more of individual fibers, yarns, braided fibers and twisted fibers. In this aspect, the fiber plies may be oriented unidirectionally, cross-plied or they may be oriented in a desired orientation that enhances their energy absorption properties. As noted above, the fiber plies may be used as-is or they may be combined with a matrix material to form a composite fiber layer. If multiple fiber plies or material layers are used, the fibers of adjacent fiber material layers or plies may include fibers oriented in the same direction, in different directions, in random directions and so forth.

The variation in the failure strain between fibers in the same layer or fibers of two or more fiber layers can be achieved in a variety of manners. In one aspect, fibers having different fiber failure strains may be selected from different materials where the different materials have different fiber failure strains. In this way, the failure strain of the fibers can be carefully selected to maximize the impact energy absorption capability of each fiber layer. Non-limiting examples of useful fiber materials include aramid fibers, ultra-high molecular weight polyethylene fibers such as Spectra or Dyneema fibers, PET fibers, nylon fibers, polyoxymethylene fibers, vinyl fibers, acrylic fibers and polypropylene fibers.

Fiber failure strain variation may also be achieved by using fibers of the same material where some of the fibers used are pre-stretched by a sufficiently higher amount in comparison to other fibers to cause their fiber failure strain to be lower than the fiber failure strain of fibers that are not pre-stretched or that are pre-stretched to lesser extent. Fibers that have been pre-stretched more during their fabrication tend to have lower failure strains and a higher stiffness in comparison to fibers that have been slightly prestretched.

In another aspect of this invention, the fiber layers can be imparted with different fiber failure strains by using fibers that are geometrically designed to have different fiber failure strains. Using fibers with different geometric designs allows for the use of the same or different materials in the same or different fiber material layers. One geometric fiber design is kinked fibers (140) versus essentially straight fibers (142) as shown in FIG. 7. By using fibers that are pre-formed such as, for example formed with kinks, in coils, with twists, braids or other geometric variations designed to control global fiber failure strain. Using fibers that are not fully extended allows the fibers to absorb some of the fluid kinetic energy by straightening to provide an initial small amount of non-destructive energy absorption and to spread the absorption of the fluid kinetic energy over a longer time and distance. Alternatively, fibers that are not fully extended and which must be extended before assuming loading can be used to form one fiber material layer while fibers that are more fully extended or that are fully extended can be used to form an adjacent fiber material layer.

In another aspect, the failure strain of the various fiber layers and the amount of energy absorbed can be controlled by controlling the tension applied to fibers that are braided, knitted, woven and so forth. For example, the failure strain of a fiber layer can be controlled by changing the braid or weave pattern or by changing the tension applied to fibers during braiding, weaving or knitting steps.

In one variant, the failure strain of the fiber material layers progressively increases from the innermost fiber layer (the layer closest to the bladder liquid) to the outermost fiber layer (the layer furthest from the bladder liquid). Bladder walls that have progressively higher failure strains towards the exterior of the bladder (furthest from the bladder fluid) can be desirable in systems where significant curvature develops in the bladder wall such that at the same instant during an event, the fibers at the exterior of the bladder wall have a higher failure strain that those towards the bladder interior. In cases where the bladder wall has less or little curvature, or the bladder wall is thin, the placement of the lower and higher failure strain fibers can be driven by factors including manufacturability, ability to aid in self-sealing and ability to prevent fiber failures from causing premature failure of adjacent fibers due to either the redistribution of load onto those adjacent fibers or due to the shock cause by the rapid unloading of the broken fibers. In such cases the fibers with different failure strains may be in different layers or disposed in the same layer. In these aspects, the bladder impact protection layer is made from two or more fiber layers that are configured to fail at progressively larger strains within the same system, so that energy is absorbed progressively during a loading event such as an object collision.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A bladder comprising a fluid impermeable material layer that is compatible with a fluid held in the bladder, and at least one impact protection layer that is conformally arranged to span a surface area of the fluid impermeable material layer wherein the impact protection layer comprises a composite material comprising a matrix material and at least one first fiber and at least one second fiber wherein the at least one first fiber fails at a lower level of strain than the at least one second fiber.

2. The bladder of claim 1 wherein impact protection layer includes a plurality of first fibers and a plurality of second fibers.

3. The bladder of claim 2 wherein the plurality of first fibers and the plurality of second fibers are each selected from one or more of aramid fibers, ultra-high molecular weight polyethylene fibers, PET fibers, nylon fibers, polyoxymethylene fibers, vinyl fibers, acrylic fibers and polypropylene fibers.

4. The bladder of claim 1 wherein the impact protection layer includes a third fiber that is controlled to withstand a higher level of strain than each of the first and second fibers.

5. The bladder of claim 1 wherein the at least one first fiber and the at least one second fiber may be one or more of individual fibers, braided fibers, knitted fibers, woven fibers and twisted fibers.

6. The bladder of claim 1 wherein the first fiber and second fiber are pre-stretched by different amounts.

7. The bladder of claim 1 wherein one of the at least one first fiber and at least one second fiber is a yarn having two or more filaments.

8. The bladder of claim 1 where the fluid held in the bladder is a liquid.

9. A aircraft comprising a fuel tank, wherein the fuel tank comprises a bladder comprising a liquid fuel impermeable material layer, and at least one impact protection layer that is conformally arranged to span a surface area of the liquid impermeable material layer wherein the impact protection layer comprises a composite material comprising a matrix material and a plurality of first fibers and a second fiber material layer having a plurality of second fibers wherein the plurality of first fibers fail at a lower level of strain than the plurality of second fibers.

10. The aircraft of claim 9 wherein a first fiber material layer including the plurality of first fibers and the second fiber material layer including the plurality of second fibers are arranged so that the first fiber material layer is nearest to the bladder.

11. The aircraft of claim 9 wherein the at least two layers of fibers each include a plurality of first fibers and a plurality of second fibers.

12. The aircraft of claim 9 wherein both the first fiber material layer and the second fiber material layer are composite material layers.

13. The aircraft of claim 9 where the bladder contains a liquid fuel.

14. The aircraft of claim 9 wherein the at least two fiber material layers are each fibrous material layers.

15. The aircraft of claim 14 wherein at least one fiber material layer is a ply of fibers selected from one or more of woven fibers, fiber mats, continuous fibers, discontinuous aligned fibers and discontinuous random oriented fibers.

16. The aircraft of claim 15 wherein the at least one fiber material layer includes two or more fiber plies.

17. The aircraft of claim 16 wherein the two or more fiber plies may be oriented unidirectionally, cross-plied, quasi-isotropic, other layups or any combination thereof.

18. A liquid bladder comprising a liquid impermeable material layer that is compatible with a liquid held in the bladder, and at least one impact protection layer that is conformally arranged to span a surface area of the liquid impermeable material layer wherein the impact protection layer comprises a composite material comprising a matrix material and a plurality of first fibers and a plurality of second fibers wherein the plurality of second fibers are geometrically designed to have a higher global failure strain than the plurality of first fibers.

19. The liquid bladder of claim 18 wherein one of the plurality of first fibers or plurality of second fibers include kinks, coils, twists, braids or other geometric variations designed to control global fiber failure strain.

20. A bladder according to claim 1 wherein the first fiber and second fiber fail sequentially and reduce the peak force applied to the fluid impermeable material layer by liquid in motion within the bladder as a result of a collision with an object.

21. A bladder comprising a fluid impermeable material layer that is compatible with a fluid held in the bladder, and at least one impact protection layer that is conformally arranged to span a surface area of the fluid impermeable material layer wherein the impact protection layer includes at least one first fiber and at least one second fiber wherein the at least one first fiber and the at least one second fiber fail sequentially and reduce the peak force applied to the fluid impermeable material layer by liquid in motion within the bladder as a result of a collision of the bladder with an object.

* * * * *